(12) United States Patent
Takagi et al.

(10) Patent No.: US 6,567,350 B1
(45) Date of Patent: May 20, 2003

(54) METHOD FOR ADJUSTING CONTROL OPERATION IN AN OPTICAL DISC RECORDING DEVICE

(75) Inventors: Yuji Takagi, Hirakata (JP); Keiichi Kawashima, Hirakata (JP); Hiroshi Sugimoto, Osaka (JP); Hirofumi Ide, Amagasaki (JP); Kenzo Ishibashi, Moriguchi (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 231 days.

(21) Appl. No.: 09/664,835

(22) Filed: Sep. 19, 2000

(30) Foreign Application Priority Data

Sep. 20, 1999 (JP) ............................................. 11-265576

(51) Int. Cl.⁷ .............................................. G11B 21/08
(52) U.S. Cl. ................... 369/30.23; 369/30.27
(58) Field of Search .................... 369/30.23, 30.27, 369/30.12, 30.16, 53.18, 53.2, 53.26, 53.27, 53.42, 53.44

(56) References Cited

U.S. PATENT DOCUMENTS 5,249,172 A * 9/1993 Hagihara et al. ........... 369/116
5,491,677 A * 2/1996 Sasaki ...................... 369/44.36
5,532,991 A * 7/1996 Sasaki ...................... 369/44.35
5,612,939 A * 3/1997 Ueki et al. .................... 369/48
6,356,515 B1 * 3/2002 Kumita et al. ................. 369/13

FOREIGN PATENT DOCUMENTS

WO           98/14938           9/1998

* cited by examiner

Primary Examiner—Tan Dinh
(74) Attorney, Agent, or Firm—Renner, Otto, Boisselle & Sklar

(57) ABSTRACT

A control adjustment method for adjusting a control of a recording/reproduction apparatus for a disc-shaped recording medium is provided, wherein the control is adjusted in response to an environmental change inside the recording/reproduction apparatus, such as a temperature change, the control adjustment method comprising the steps of: requesting an execution of the control adjustment; determining whether to inhibit or approve the execution of the control adjustment; and executing the control adjustment in the case where the execution of the control adjustment is approved in the step of determining the execution of adjustment.

18 Claims, 13 Drawing Sheets

METHOD FOR ADJUSTING CONTROL OPERATION IN AN OPTICAL DISC RECORDING DEVICE

BACKGROUND OF THE INVENTION

1. Field of the Invention

The present invention relates to a control adjustment method for a reproduction/recording apparatus for a disc-shaped recording medium which performs real-time reproduction/recording of audiovisual (AV) data, such as television broadcasting. The present invention also relates to a reproduction/recording apparatus for a disc-shaped recording medium.

2. Description of the Related Art

Optical discs are now available as reproduction/recording mediums used in reproduction/recording apparatuses, such as optical disc video recorders. Data is reproduced from or recorded to an optical disc by focusing light which is emitted from a semiconductor laser onto an information surface of the disc so that the light converges on a micro-scale spot with a diameter of 1 micron or less. As a high-density, mass storage recording medium, such an optical disc has random access characteristics better than that of conventional tape media. In addition, a noncontact reproduction/recording using a laser beam reduces deterioration due to repeated use, thereby enabling disc manufacturers to mass-produce low-cost duplications by means of mastering.

CDs are an example of optical discs, which has replaced the conventional analog record and has become popular as a high quality-sound digital audio medium. Also in recent years, DVD has been commercialized as a high quality digital image-recording medium. In view of these trends, it is predictable that optical discs will develop further in the future as digital recording media for AV data.

CDs and DVDs are reproduction-only optical discs, on which data is pre-recorded. On the contrary, recordable optical discs have been developed in recent years, on which users can record AV data at home. An example of such an optical disc is DVD-RAM. Furthermore, in order to reproduce/record television programs, for example, from/to these recordable optical discs apparatuses such as optical disc video recorders are now under development. These video recorders are now regarded as novel products which will replace conventional video tape recorders such as VHS.

For such a reproduction/recording apparatus for performing noncontact recording/reproduction and capable of high density recording, it is indispensable to employ: a tracking control technique for making the laser beam stably follow lands or tracks provided in advance on the media; a focus control technique for forming the micro-scale spot; and a laser power control technique for achieving a laser output with a stable power. As the recording density becomes higher, more accuracy is required for these techniques.

In order to improve the accuracy of the aforementioned control techniques, control adjustments have been incorporated into the reproduction/recording apparatuses, in order to adjust the control of the reproduction/recording apparatuses in response to environmental changes such as a temperature change inside the reproduction/recording apparatus. According to such a control adjustment, when the temperature inside the apparatus changes, a process of control adjustment in response to the ambient temperature around or the internal temperature inside the apparatus is performed, even in recording or reproduction, so that the control corresponds to the changes in circuit characteristics and the output power of the semiconductor laser, which depends on temperature. By performing such a control adjustment, a more accurate control is achieved.

The above control adjustment method regarding temperature change will now be described in detail with reference to FIGS. 1 to 3.

FIG. 1 is a plan view of the recording surface of an optical disc 100, which is a disc-shaped recording medium. The optical disc 100 is provided thereon with a data region 101 and a lead-in region 102. The data region 101 includes regions for recording audiovisual (AV) data, and the lead-in region includes control tracks for recording disc management information and a test region 104 for performing control adjustments. Although not shown in FIG. 1, a plurality of tracks for recording data are formed on the recording surface of the optical disc along circumference direction. Each track is divided into a plurality of sectors, each of which is the basic unit for data reproduction/recording.

An example of AV data to be recorded on the data region 101 is program information such as a TV broadcast. On an optical disc capable of random access, a single program may be divided into a plurality of portions and recorded to a plurality of regions as a result of repeated recording and deleting. For example, FIG. 1 shows a case where a single program information is recorded to three regions 103a, 103b, and 103c.

Data recording to the optical disc of FIG. 1 will now be described.

Data a to be recorded is first recorded to the region 103a, thereby becoming recorded data a. The next data is recorded to the region 103b, and in order to achieve this recording, an optical head for recording, which is provided in the reproduction/recording apparatus, has to be moved from the region 103a to the region 103b. This is called a seek operation. Herein, the term "seek" includes not only the movement of the optical head to a target track for reproduction/recording but also the holding of the optical head until the target sector reaches the optical head by the disc rotation. Furthermore, in the case of a CLV method or a ZCAV method, in which the rotation speed of the disc is changed for the reproduction or recording, the term "seek period" means not only the time required for the seek operation as described above but also the time required before the next reproduction/recording can be performed. This includes the setting time before the rotation speed of the disc motor reaches an appropriate speed for reproduction/recording.

After the execution of the seek operation, data b to be recorded is recorded to the region 103b, thereby becoming recorded data b. Next, the seek operation from the region 103b to the region 103c is performed, and the data c to be recorded is recorded to the region 103a, thereby becoming recorded data c. Accordingly, seeks and recordings are repeated so as to divide and record continuous single AV data to a plurality of regions.

The data to be recorded during the seek operation is temporarily stored in a semiconductor memory of the reproduction/recording apparatus, and then recorded to a recording region after the seek operation is completed. FIG. 2 is a buffer model illustrating the quantity of data temporarily stored in the semiconductor memory during the recording of the data a, b, and c, to the respective regions 103a, 103b and 103c. In FIG. 2, the horizontal axis represents time and the vertical axis represents the stored data quantity.

During the period 201, the data a is first recorded. The data is recorded at a faster speed than the data generating speed, and therefore the quantity of data stored in the semiconductor memory decreases. Eventually, the data is recorded immediately after it is generated. After the data a is recorded, a seek operation for recording the data b is performed during the period 202. During the seek operation, a data recording on the disc is impossible, and therefore all of the generated data is temporarily stored in the memory, and the stored data quantity increases. When the seek is completed, the stored data quantity reaches the maximum value A in FIG. 2.

After the optical head reaches the region 103b for recording the data b, the data stored during the seek period 202 is recorded, as well as the data b, in the period 203. The data is recorded at a faster speed than the data generating speed, and therefore the quantity of data stored in the semiconductor memory decreases. Eventually, the stored data quantity is close to zero, and thereafter the data is recorded almost immediately after it is generated.

In the period 204, a seek operation for recording the data c is performed, as in the seek period 202 for the data b. During the period 204, a data recording on the disc is impossible, and therefore all the generated data is temporarily stored in the memory and the stored data quantity increases. As in the period 203 for recording the data b, the data stored during the seek period 204 is recorded, as well as the data c, in the period 205. The data is recorded at a faster speed than the data generating speed, and therefore, the quantity of data stored in the semiconductor memory decreases. Eventually, the stored data quantity is close to zero, and thereafter the data is recorded almost immediately after it is generated.

In the above case where the seeking recording are merely repeated, the data transmitted during the seek operation can temporarily stored in the memory by providing the reproduction/recording apparatus with a semiconductor memory capable of storing data larger than the data generated during the maximum seek duration. This makes it essentially possible to perform, real time continuous recording of the AV data even though it is actually a split recording divided by seek operations. In FIG. 2, the maximum value of the data stored in the memory is represented by A. For example, when the maximum seek duration is one second and the data generating speed is 10 Mbps, the stored data quantity will be 10 Mbit. Therefore, by using a semiconductor memory having a capacity larger than this quantity, a continuous recording of AV data is achieved.

A control adjustment method for a conventional reproduction/recording apparatus will now be described. According to the conventional control adjustment, the temperature inside the apparatus is first measured, and if the temperature change detected is equal to or more than a predetermined value, a control adjustment is requested. In the conventional example, a control adjustment is conducted immediately after the request. FIG. 3 is a buffer model of the conventional control adjustment during recording. In this model, the control adjustment is conducted based on the control adjustment request addressed with the worst timing, i.e., immediately after a seek. In FIG. 3, the horizontal axis represents time and the vertical axis represents the stored data quantity.

During the period 301, the data a is first recorded. The data is recorded at a faster speed than data generating speed, and therefore the quantity of the data stored in the semiconductor memory decreases. Eventually, the data is recorded in the disk almost immediately after it is generated.

After the data a is recorded, a seek operation for recording the data b is performed in a period 302. During the period 302, a data recording on the disc is impossible, and therefore all of the generated data is temporarily stored in the memory and the stored data quantity increases. When the seek is completed, the stored data quantity reaches the maximum value A as shown in FIG. 3.

A control adjustment request is addressed at the time 307 when the period 302 is over (i.e., immediately before the start of the recording of the data b). According to the conventional example, a control adjustment is conducted immediately after a control adjustment request is addressed. Therefore, the control adjustment begins immediately after the time 307.

The control adjustment is performed in the following manner. For example, in the case where the recording power of the laser used for the recording is adjusted, the optical head is moved from the data region 101 for data recording to the test region 104 provided at the innermost periphery (or the outermost periphery) of the optical disc as shown in FIG. 1. Then, by experimentally recording and reproducing test data while changing the recording power by small amounts, the most suitable recording power corresponding to the current temperature is detected. A circuit constant of the reproduction/recording apparatus is adjusted based on the detected most suitable recording power, and the recording thereafter is performed by the most suitable recording power.

During the control adjustment, a data recording on the disc is impossible, and therefore all of the generated recording data is temporarily stored in the memory and the stored data quantity increases as shown in FIG. 3. After the control adjustment is performed, the second seek (not shown) is conducted for returning the optical head to the region 103b for recording the data b. When this second seek is completed, the stored data quantity has reached the maximum value B in as shown FIG. 3.

After the optical head reaches the region 103b, the data stored during the seek period 303 is recorded, as well as the data b, in the period 304. The data is recorded at a faster sped than the data generating sped, and therefore the quantity of data stored in the semiconductor memory decreases. Eventually, the stored data quantity is close to zero, and thereafter the data is recorded almost immediately after it is generated.

During the period 305, a seek operation for recording the data c is performed, as in the seek period 302 for the data b. During the period 305, data recording on the disc is impossible, and therefore all of the generated data is temporarily stored in the memory and the stored data quantity increases.

As in the period 304 for recording the data b, the data stored during the seek period 305 is recorded, as well as the data c, in the next period 306. The data is recorded at a faster speed than the data generating speed, and therefore the quantity of data stored in the semiconductor memory decreases. Eventually, the stored data quantity is close to zero, and thereafter the data is recorded almost immediately after it is generated.

As described above, in the case where control adjustments are performed during the repeated seeking and recording, the conventional apparatus requires a semiconductor memory having a capacity larger than the data generated during the maximum seek duration and the data generated during the control adjustment, in order to achieve real time, continuous reading of AV data without interruption.

In FIG. 3, the maximum value of the data stored in the memory is represented by reference numeral B. For example, when the maximum seek duration is one second, the control adjustment period is one second, and the data generating speed is 10 Mbps, the value B will be 20 Mbit. Therefore, in order to perform a control adjustment during a seek operation, the semiconductor memory has to have twice the capacity that is needed when only the seek operation is performed.

Accordingly, in the case where the control adjustment is performed during the reproduction/recording of real-time data such as a TV program, the conventional apparatus requires a large capacity semiconductor memory for temporarily storing the reproduction/recording data generated during the control adjustment process, in order to prevent an interruption to AV data reading for recording or reproduction during the period required between the start and the end of the control adjustment (i.e., a few seconds or more).

SUMMARY OF THE INVENTION

According to one aspect of this invention, a control adjustment method for adjusting a control of a recording/reproduction apparatus for a disc-shaped recording medium is provided, wherein the control is adjusted in response to an environmental change inside the recording/reproduction apparatus, such as a temperature change, the control adjustment method including the steps of: requesting an execution of the control adjustment; determining whether to inhibit or approve the execution of the control adjustment; and executing the control adjustment in the case where the execution of the control adjustment is approved in the step of determining the execution of adjustment.

In one embodiment of the invention, the disc-shaped recording medium includes a plurality of recording regions provided thereon. Audiovisual data is recorded in the plurality of recording regions by an optical head. A seek operation is performed during a recording or reproduction of the audiovisual data, such that in the seek operation the optical head moves between the plurality of recording regions. In the step of determining the execution of the control adjustment, the execution of the control adjustment is inhibited during a predetermined period of time after the execution of the seek operation.

In one embodiment of the invention, the recording medium includes a plurality of recording regions provided thereon. Audiovisual data is recorded in the plurality of recording regions by an optical head. A seek operation is performed during a recording or reproduction of the audiovisual data, such that in the seek operation the optical head moves between the plurality of recording regions. In the step of determining the execution of the control adjustment, the execution of the control adjustment is inhibited in the case where a seek operation is expected to occur within a predetermined period of time from the moment of determination.

In one embodiment of the invention, the occurrence of the seek operation is expected base on: a file management information regarding a recorded location of the audiovisual data on the recording medium; and the location where the current recording/reproduction is being performed.

In one embodiment of the invention, the recording/reproduction apparatus includes a memory section for temporarily storing audiovisual data for recording/reproduction. In the step of determining the execution of the control adjustment, an inhibition or approval of the execution of the control adjustment is determined based on a quantity of data stored in the memory section during recording/reproduction.

In one embodiment of the invention, the control adjustment is inhibited during recording, in the case where the quantity of the data stored in the memory section is equal to or more than a predetermined first data quantity.

In one embodiment of the invention, the control adjustment is inhibited during reproduction, in the case where the quantity of the data stored in the memory section is equal to or less than a predetermined second data quantity.

In one embodiment of the invention, the execution of the control adjustment is requested in the step of requesting adjustment when it is detected that there is an internal temperature change of the apparatus from a previous execution of the control adjustment by a predetermined temperature difference or more.

In one embodiment of the invention, the adjustment executing step includes: the steps of adjusting laser power during recording; and adjusting focus position during reproduction.

According to another aspect of this invention, a recording/reproduction apparatus is provided, the recording/reproduction apparatus including: a recording/reproduction section for recording/reproducing audiovisual data on a disc-shaped recording medium; a memory section for temporarily storing audiovisual data for recording/reproduction; an adjustment request section for outputting an adjustment request for executing control adjustment; an adjustment determination section for determining whether to inhibit or approve the execution of the control adjustment, and outputting an instruction indicating inhibition or approval; and an adjustment execution section for executing the control adjustment in the case where the instruction indicating approval is received.

In one embodiment of the invention, the recording medium includes a plurality of recording regions provided thereon. Audiovisual data is recorded in the plurality of recording regions by an optical head. A seek operation is performed during a recording or reproduction of the audiovisual data, such that in the seek operation the optical head moves between the plurality of recording regions. The adjustment determination section outputting an instruction indicating inhibition of the execution of the control adjustment during a predetermined period of time after the execution of the seek operation to the adjustment execution section.

In one embodiment of the invention, the recording medium includes a plurality of recording regions provided thereon. Audiovisual data is recorded in the plurality of recording regions by an optical head. A seek operation is performed during a recording or reproduction of the audiovisual data, such that in the seek operation the optical head moving between the plurality of recording regions. The adjustment determination section inhibits the execution of the control adjustment in the case where a seek operation is expected to occur within a predetermined period of time from the moment of determination.

In one embodiment of the invention, the occurrence of the seek operation is expected based on: a file management information regarding a recorded location of the audiovisual data on the recording medium; and the location where the current recording/reproduction is being performed.

In one embodiment of the invention, an inhibition or approval of the execution of control adjustment is determined based on a quantity of data stored in the memory section during recording/reproduction.

In one embodiment of the invention, the control adjustment is inhibited during recording, in the case where the quantity of the data stored in the memory section is equal to or more than a predetermined first data quantity.

In one embodiment of the invention, the control adjustment is inhibited during reproduction, in the case where the quantity of the data stored in the memory section is equal to or less than a predetermined seconds data quantity.

In one embodiment of the invention, the adjustment request section outputs a request of adjustment when it is detected that there is an internal temperature change of the apparatus from a previous execution of the control adjustment by a predetermined temperature difference or more.

In one embodiment of the invention, the adjustment execution section performs adjustment of laser power during recording and adjustment of focus position during reproduction.

Thus, the invention described herein makes possible the advantages of (1) providing a control adjustment method achieved with a small capacity semiconductor memory during real-time data reproduction/recording, and (2) providing a reproduction/recording apparatus capable of performing such a control adjustment.

These and other advantages of the present invention will become apparent to those skilled in the art upon reading and understanding the following detailed description with reference to the accompanying figures.

DESCRIPTION OF THE PREFERRED EMBODIMENTS

According to the reproduction/recording apparatus for a disc-shaped recording medium of the present invention, when a control adjustment request is addressed regarding environmental changes such as a temperature change inside the reproduction/recording apparatus, a determination is first made whether to inhibit or approve the execution of the control adjustment. Based on this determination, a control adjustment is performed when the execution of the control adjustment is approved. The environmental change is not limited to the temperature change inside the reproduction/recording apparatus, but also includes, for example, change in the voltage which is supplied to the reproduction/recording apparatus for operation.

Examples of the present invention will now be described, with reference to exemplary control adjustments corresponding to the temperature change inside the reproduction/recording apparatus, and with a special reference to methods for determining the inhibition or approval of the execution of the control adjustment and the structures therefor.

FIRST EXAMPLE

As a first example, a control adjustment method for a reproduction/recording apparatus for a disc-shaped recording medium according to the present invention will be described.

According to the present example, the inhibition or approval of the execution of the control adjustment is determined based on the quantity of data stored in the semiconductor memory (buffer memory) inside the reproduction/recording apparatus, which temporarily stores the AV data during the reproduction/recording.

Specifically, in the case where the quantity of data stored in the memory section is equal to or more than a predetermined first data quantity, the control adjustment is inhibited during recording even if a control adjustment request is addressed. The first data quantity is a value smaller than the value obtained by subtracting the data quantity generated during the control adjustment from the total capacity of the semiconductor memory.

On the other hand, in the case where the quantity of data stored in the memory section is equal to or less than a predetermined second data quantity, the control adjustment is inhibited during reproduction even if a control adjustment request is addressed. The second data quantity is a value larger than the data quantity transmitted to an external TV monitor from the reproduction/recording apparatus during the control adjustment.

Figure 4A:
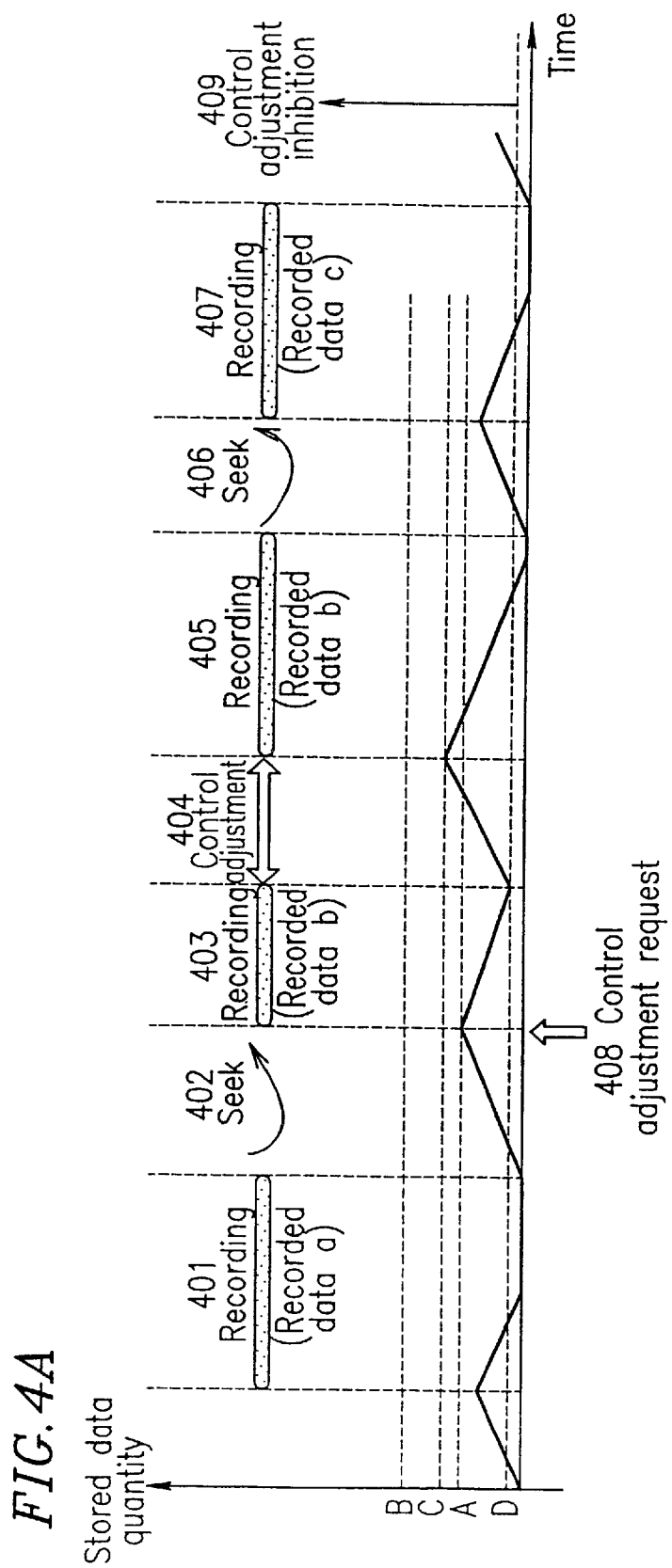
FIG. 4A is a buffer model during recording according to a first example of a control adjustment method of the present invention.

A control adjustment operation during recording according to the present example will now be described with reference to FIG. 4A. FIG. 4A is a buffer model in the case where a recording and a control adjustment are performed. In FIG. 4A, the horizontal axis represents time and the vertical axis represents the quantity of data stored in the semiconductor memory of the reproduction/recording apparatus (stored data quantity).

Figure 1:
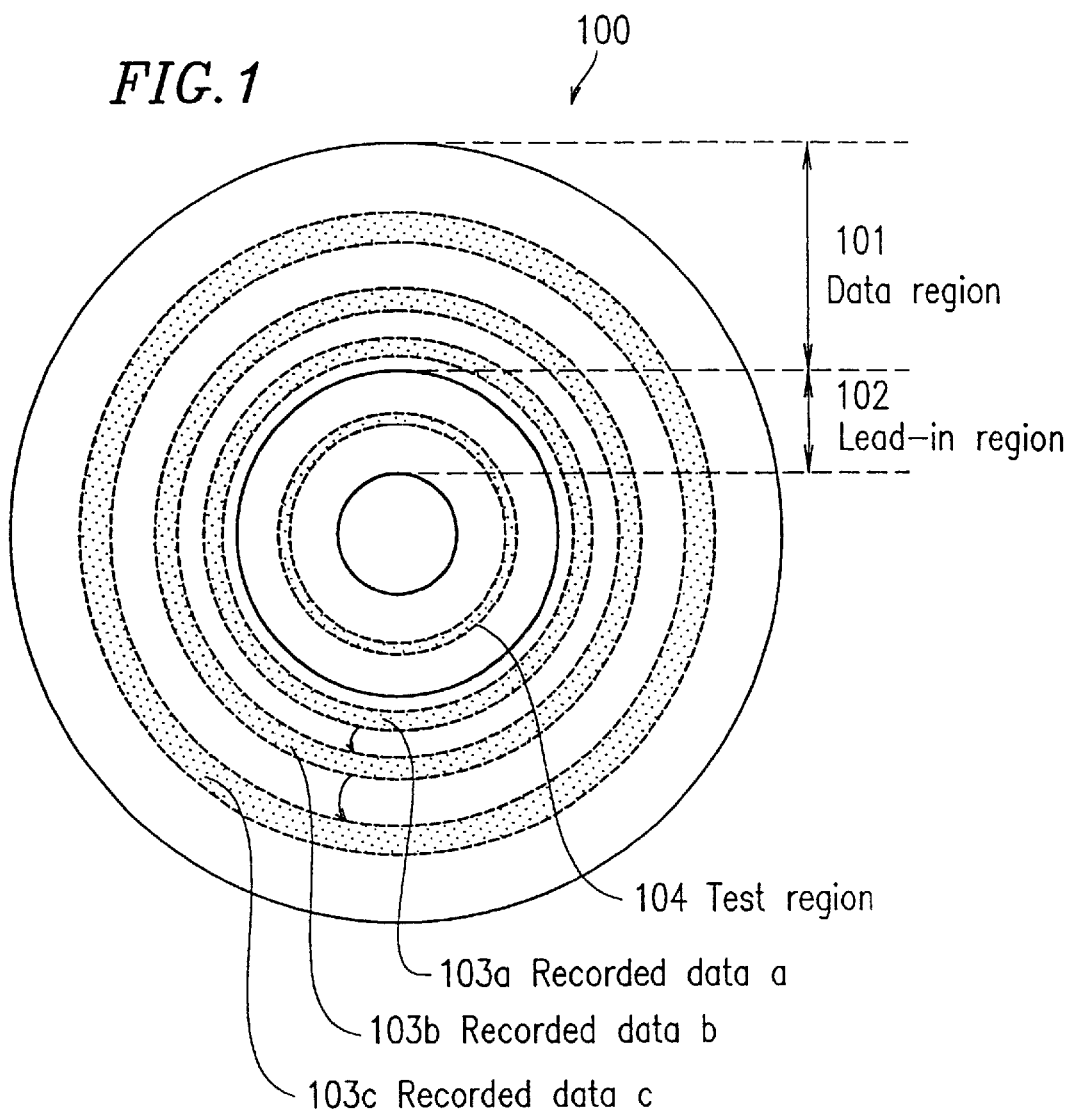
FIG. 1 is a plan view of an optical disc.
Figure 2:
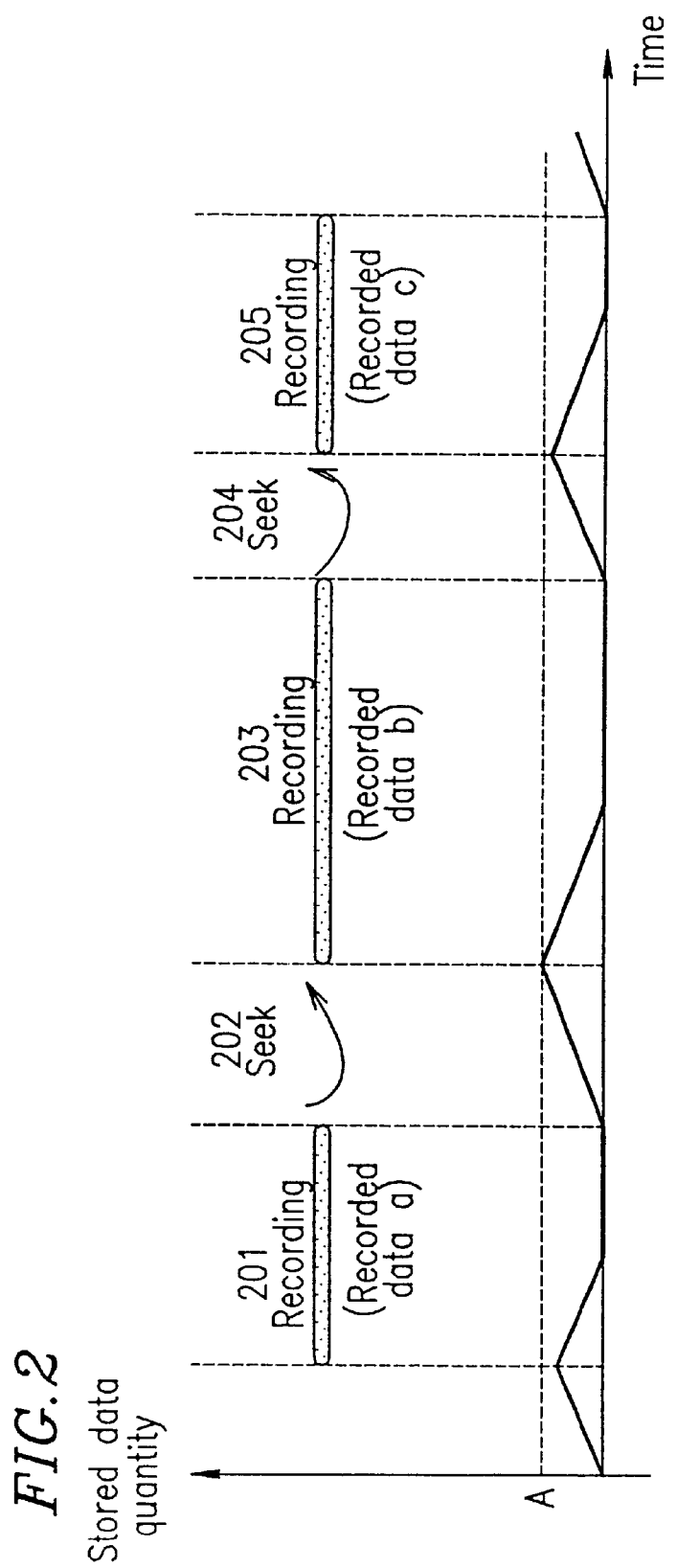
FIG. 2 is a buffer model during recording.
Figure 3:
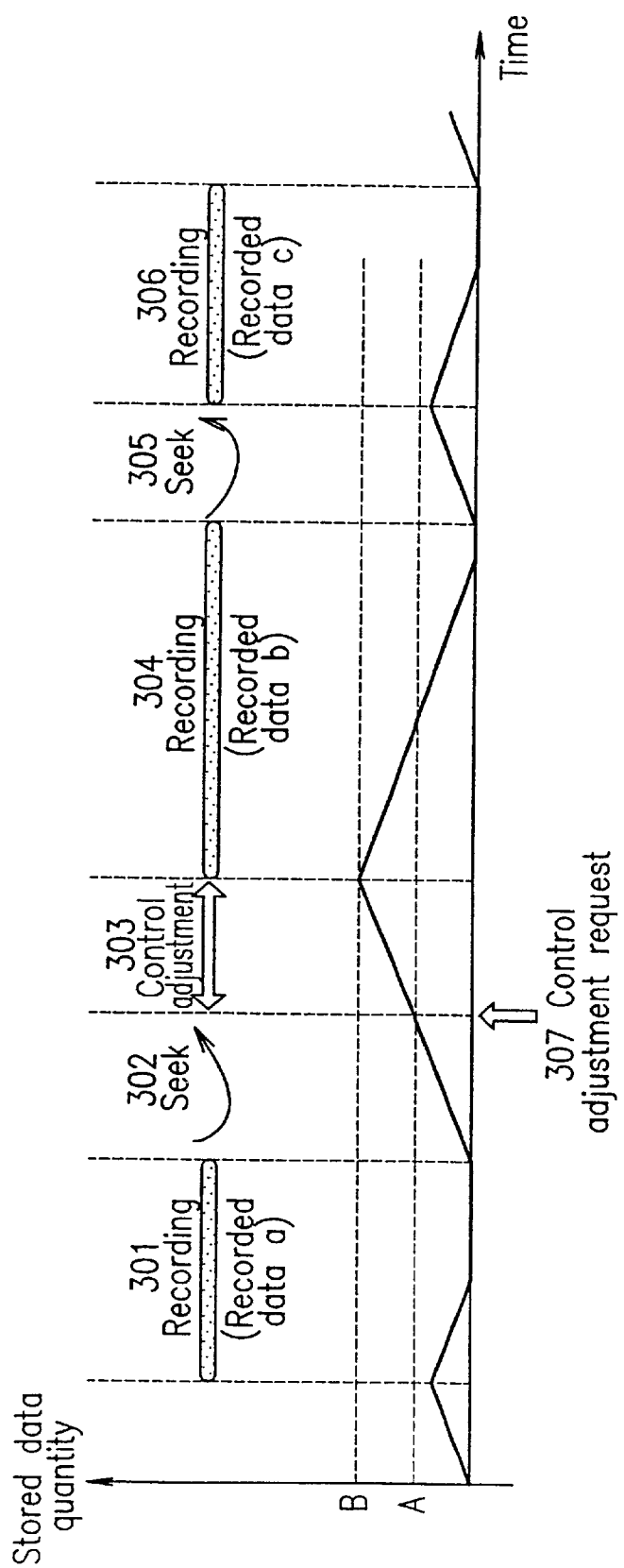
FIG. 3 is a conventional buffer model during recording and control adjustment.

As in the example shown in FIGS. 1 and 2, the example of FIG. 4A relates to the case where data a, b, and c are recorded on an optical disc 100. As in the example shown in FIG. 3, a control adjustment request is addressed at a time immediately after a seek. The basic operation for recording the data a, b, and c on an optical disc 100 and the definitions of the terms "seek" and "seek duration" are similar to those described earlier with reference to FIG. 1.

In the period 401, the data a is first recorded. The data is recorded at a faster speed than the data generating speed, and therefore the quantity of the data stored in the semiconductor memory decreases. Eventually, the data is recorded almost immediately after it is generated.

A seek operation for recording the data b is performed in the next period 402. During the period 402, a data recording on the disc is impossible, and therefore all of the generated data is temporarily stored in the memory by means of digitizing and further compressing the TV broadcast received from an antenna provided outside the reproduction/recording apparatus. As a result, the stored data quantity increases. When the seek is completed, the stored data quantity reaches the maximum value A in FIG. 4A.

A control adjustment request is addressed immediately after the seek period 402 (i.e., the time 408 immediately before the recording of the data b is begun). According to the present example, a control adjustment is conducted only in the case where the quantity of data stored in the memory section is equal to or more than a predetermined first data quantity. At the time 408, the data quantity is more than the first data quantity D. Therefore, no control adjustment is performed (the control adjustment is inhibited).

During the period 403, the data b is recorded. The data is recorded at a faster speed than the data generating speed, and therefore the quantity of data stored in the semiconductor memory decreases.

When the quantity of the stored data reaches the quantity less than the first data quantity D during the recording of the data b, the control adjustment being requested is begun (period 404). The control adjustment is performed in the following manner. For example, in the case where the recording power of the laser used for the recording is adjusted, the optical head of the reproduction/recording apparatus is moved from the data region 101 for data recording to the test region 104 provided at the innermost periphery (or the outermost periphery) of the optical disc. Then, by experimentally recording and reproducing test data while changing the recording power by a small amount, the most suitable recording power corresponding to the current temperature is detected. The circuit constant is adjusted based on the detected most suitable recording power, and the recording thereafter is performed at the most suitable recording power.

During the control adjustment, a data recording on the disc is impossible, and therefore all of the generated data is temporarily stored in the memory and the stored data quantity increases as shown in FIG. 4A. After the control adjustment is performed, a second seek (not shown) is conducted for returning the optical head to the region 103b for recording the data b. When this second seek is completed, the stored data quantity has reached the maximum value C in FIG. 4A.

After the optical head reaches the region 103b, the data stored during the control adjustment period 404 is recorded, as well as the data b, in the period 405. The data is recorded at a faster speed than the data generating speed, and therefore the quantity of data stored in the semiconductor memory decrease. Eventually, the stored data quantity is close to zero, and thereafter the data is recorded almost immediately after it is generated.

In a period 406, a seek operation for recording the data c is performed, as in the seek period 402 for the data b. During the period 406, a data recording on the disc is impossible, and therefore all of the generated data is temporarily stored in the memory and the stored data quantity increases.

As in the period 403 for recording the data b, the data stored during the seek period 406 is recorded, as well as the data c, in the next period 407. The data is recorded at a faster speed than the data generating speed, and therefore the quantity of data stored in the semiconductor memory decreases. Eventually, the stored data quantity is close to zero, and thereafter the data is recorded almost immediately after it is generated.

As described above, according to the present example, the control adjustment is performed only when the quantity of data stored in the buffer memory is smaller than the first data quantity D. As a result, the quantity of the stored data does not exceed the quantity stored in the buffer memory immediately after the seek operation. Therefore, according to the present example, even in the case where control adjustments are performed during the repeated seeking and recording, a real time, continuous recording of AV data without interruption is achieved with a semiconductor memory having a capacity smaller than that of the conventional example.

Regarding the maximum value C of the stored data quantity in FIG. 4A, suppose the first data quantity D=1 Mbit, and if the maximum seek period is one second, the control adjustment performing period is one second, and the data generation speed is 10 Mbps, the data quantity C will be 11 Mbit. Accordingly, the present example achieves real time, continuous reading of AV data without interruption with a semiconductor memory having a capacity smaller than that in the conventional example.

On the other hand, suppose the capacity of the mounted semiconductor memory is X, the predetermined first data quantity D for determining whether to inhibit or approve the execution of the control adjustment is determined by:

$$D < X - \text{control adjustment performing time} \times \text{data generation speed}.$$

Figure 4B:
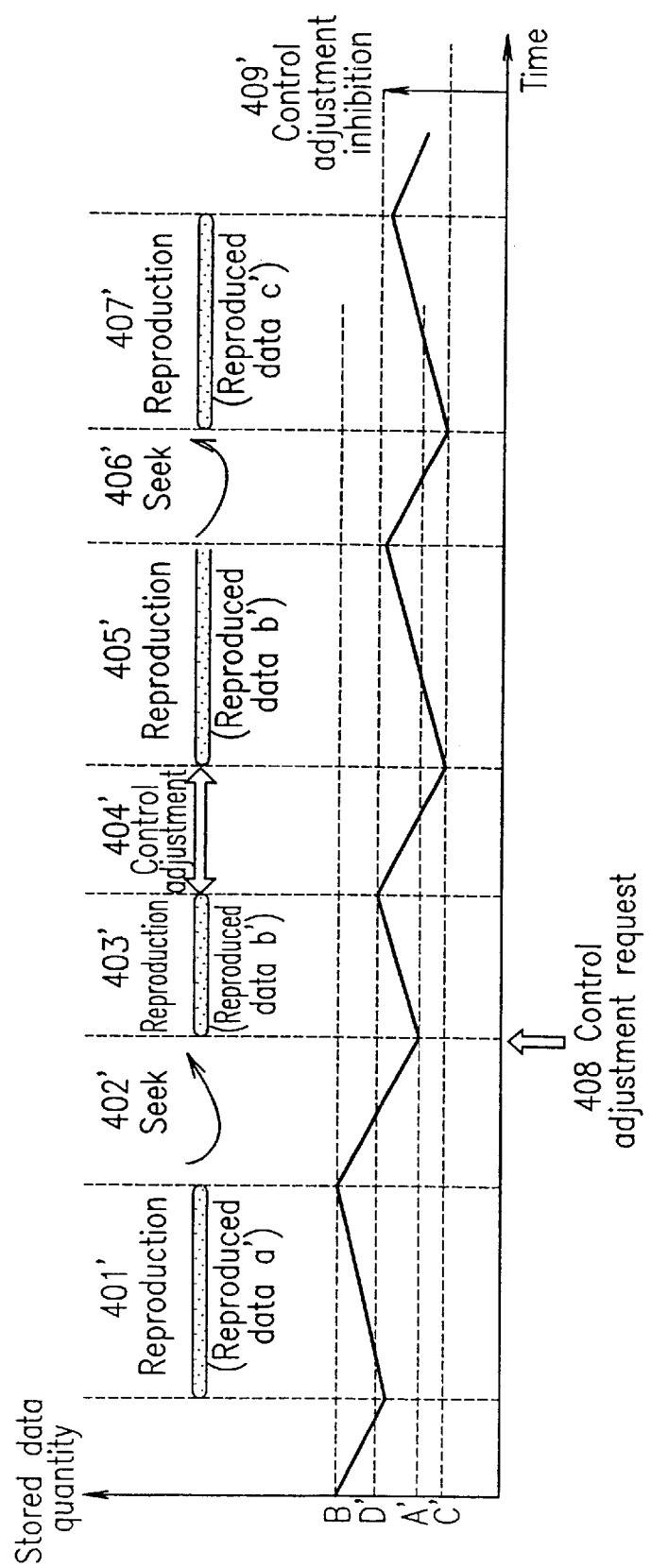
FIG. 4B is a buffer model during reproduction according to the first example of the control adjustment method of the present invention.

A control adjustment operation during reproduction according to the present example will now be described with reference to FIG. 4B. FIG. 4B is a buffer model in the case where a reproduction and a control adjustment are performed. In FIG. 4B, the horizontal axis represents time and the vertical axis represents the quantity of data stored in the semiconductor memory of the reproduction/recording apparatus (stored data quantity) during reproduction/recording. The example of FIG. 4B corresponds to the example of FIG. 4A, i.e., the example of FIG. 4B relates to the case where data a, b, and c recorded on the optical disc 100 are reproduced, and also relates to the case where a control adjustment request is addressed at a time immediately after a seek.

In the period 401', the data a is first reproduced, thereby forming reproduced data a'. The data is output to an external TV monitor and the like at a speed slower than the speed at which the AV data is read from the optical disc 100. Therefore the quantity of data stored in the semiconductor memory increases.

A seek operation for reproducing the data b is performed in the next period 402'. During the seek operation, a data reading from the disc is impossible, and therefore only a transmitting operation is performed, in which the reproduced data temporarily stored in the memory is transmitted to the external TV monitor. As a result, the stored data quantity decreases to the value A'.

A control adjustment request is addressed immediately after the seek period 402' (i.e., the time 408 immediately before the start of the reproduction of the data b). According to the present example, a control adjustment is conducted only in the case where the quantity of data stored in the buffer memory is equal to or more than a predetermined second data quantity D'. At the time 408, the data quantity is less than the second data quantity D'. Therefore, control adjustment is inhibited. Instead, the data b is reproduced (period 403'). The data is transmitted to an external TV monitor at a slower speed than the sped at which the data is read from the optical disc, and therefore the quantity of data stored in the semiconductor memory increases.

When the quantity of the stored data reaches a quantity more than the second data quantity D', the control adjustment being requested in begun (period 404'). The control adjustment is performed in the following manner. For example, even in reproduction, in order to promptly conduct the recording following the current reproduction, it is usually necessary to adjust the recording power of the laser used for the recording to be the most suitable recording power corresponding to the current temperature. In the adjustment of the recording power of the laser used for the recording for the above purpose, the optical head is moved from the data region 101 for data reproducing to the test region 104 provided at the innermost periphery (or the outermost periphery) of the optical disc. Then, by experimentally recording and reproducing test data while changing the recording power by a small amount, the most suitable recording power corresponding to the current temperature is detected. The circuit constant is adjusted based on the detected most suitable recording power, and the recording thereafter is performed by the most suitable recording power. On the other hand, for example, the equalizing correction amount of the reproduction circuit or the focus position may be adjusted in the control adjustment corresponding to the current temperature so as to keep the reproduction in the moat suitable state.

During the control adjustment operation, a data reading from the disc is impossible, and therefore only a transmitting operation is performed, in which the reproduced data temporarily stored in the memory is transmitted to the external TV monitor. As a result, the stored data quantity decreases. After the control adjustment is performed, the second seek (not shown) is conducted for returning the optical head to the region 103b for recording the data b. When this second seek is completed, the stored data quantity has reached the value C' in FIG. 4B.

After the optical head reaches the region 103b, the data b is sequentially reproduced in the period 405'. The data is transmitted to the external TV monitor at a slower speed than the speed at which the data is read from the optical disc, and therefore the quantity of data stored in the semiconductor memory gradually increases.

As in the period 402' for the data b, a seek operation for reproducing the data c is performed in the period 406'. During the seek operation, a data reading from the disc is impossible, and therefore only a transmitting operation is performed, in which the reproduced data temporarily stored in the memory is transmitted to the external TV monitor. As a result, the stored data quantity decreases.

In the next period 407', the data a is reproduced in a manner similar to that in the period 403'. The data is transmitted to the external TV monitor at a slower speed than the speed at which the data is read from the optical disc, and therefore the quantity of data stored in the semiconductor memory gradually increases.

Accordingly, the control adjustment during reproduction is performed only when the pre-read data, which is stored in the buffer memory, is larger than the predetermined second data quantity D'. Therefore, even if the control adjustment is performed during reproduction, the impossibility of a real-time reproduction of AV data, which otherwise occurs due to the lack of data stored in the semiconductor memory, is prevented. Thus, a semiconductor memory having a capacity smaller than that in the conventional example can be used.

As described above, according to the present example, whether to inhibit or approve the execution of the control adjustment is determined based on the data quantity stored in the buffer memory during reproduction/recording. In other words, a period in which the control adjustment is substantially inhibited. Therefore, even if the semiconductor memory used has a smaller capacity, real-time reproduction/recording of AV data is possible while performing the control adjustment.

SECOND EXAMPLE

As a second example, another control adjustment method for a reproduction/recording apparatus for a disc-shaped recording medium according to the present invention will be described.

In the first example, whether to inhibit or approve the execution of the control adjustment is determined based on the data quantity stored in the buffer memory during reproduction/recording, in the present example, the control adjustment inhibition interval is provided immediately before and after a seek operation, and the execution of the control adjustment is determined based on whether or not the moment of determination is within the predetermined control adjustment inhibition interval. In the predetermined control adjustment inhibition interval, no control adjustment is performed even if a control adjustment request is addressed. The control adjustment inhibition interval can be set based on allotting a recording region predetermined before the start of the recording.

Figure 5:
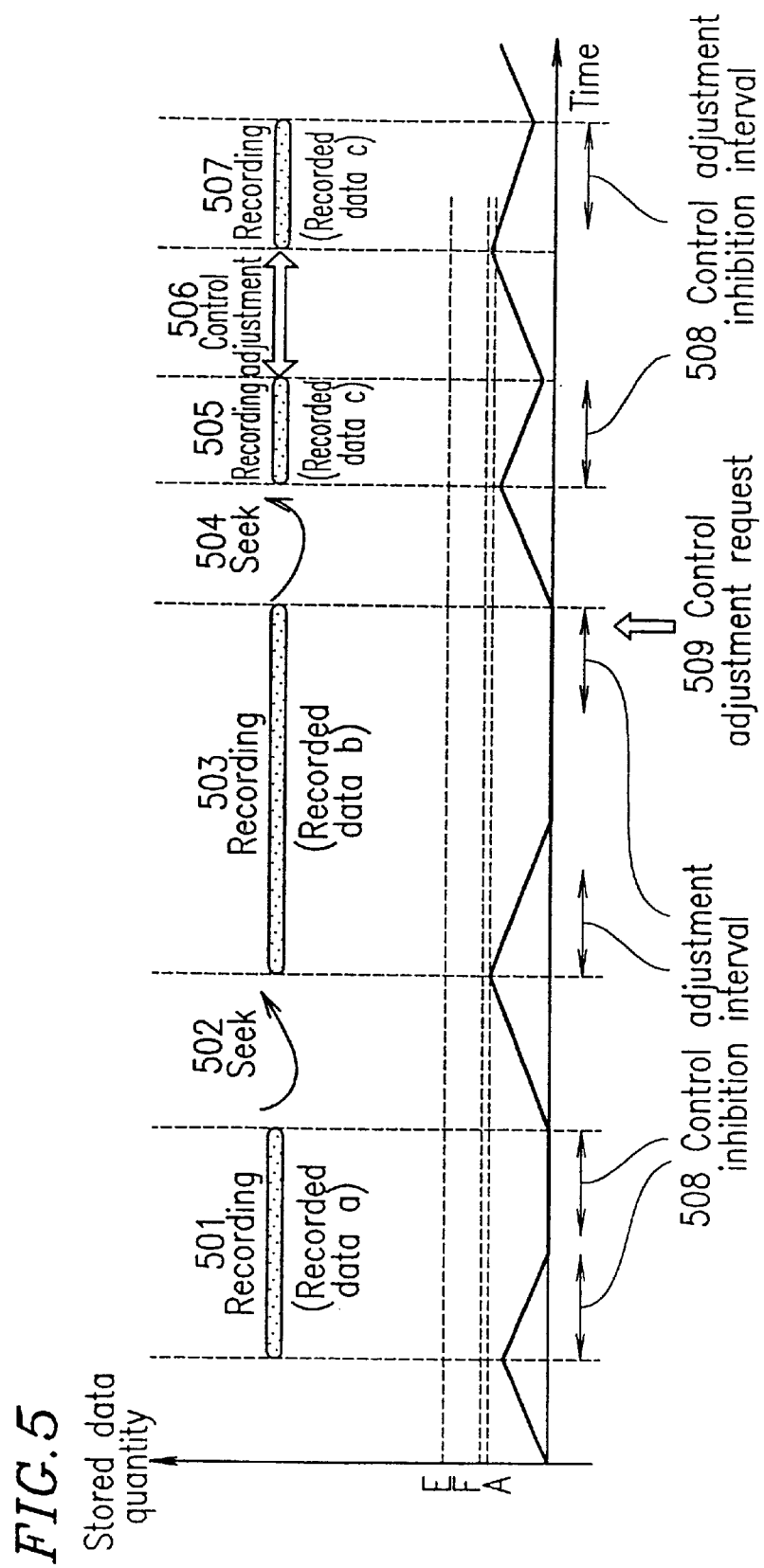
FIG. 5 is a buffer model during recording according to a second example of a control adjustment method of the present invention.

FIG. 5 is a buffer model in the case where a reproduction and a control adjustment are performed. In FIG. 5, the horizontal axis represents time and the vertical axis represents the quantity of data stored in the semiconductor memory of the reproduction/recording apparatus (stored data quantity) during reproduction/recording. As in the example shown in FIGS. 1 and 2, the example of FIG. 5 relates to the case where data a, b, and c are recorded on the optical disc 100.

As shown in FIG. 5, a control adjustment inhibition interval 508 is provided immediately before and after each of the seek periods 502 and 504.

During the period 501, the data a is first recorded. The data is recorded at a faster speed than the data generating speed, and therefore the quantity of data stored in the semiconductor memory decreases. Eventually, the data is recorded almost immediately after it is generated.

A seek operation for recording the data b is performed in the next period 502. During the period 502, a data recording on the disc is impossible, and therefore all of the generated data is temporarily stored is the memory by means of digitizing and further compressing the TV broadcast received from an antenna provided outside the reproduction/recording apparatus. As a result, the stored data quantity increases. When the seek is completed, the stored data quantity reaches the data quantity A in FIG. 5.

In the next period 503, the data stored during the seek period 502 is recorded, as wall as the data b. The data is recorded at a faster speed than the data generating speed, and therefore the quantity of data stored in the semiconductor memory decreases. Eventually, the stared data quantity is aloes to zero, sad thereafter the data is recorded almost immediately after it is generated.

A control adjustment request is addressed at time 509 which is immediately before completing the recording of the data b. Since the control adjustment inhibition interval 508 is provided immediately before or after each of the seek periods, any control adjustment is inhibited even if a control adjustment request is addressed at time 509.

Therefore, instead of performing the control adjustment, a sank operation for recording the data a is performed attar the period 503 is over (in period 504). During the period 504, a data recording on the disc is impossible, and therefore all of the generated data is temporarily stored in the memory and the stared data quantity increases.

After the seek period 504 is over, the data stored during the seek period 504 is recorded, as well as the data c, in the period 505. The data is recorded at a faster speed than the data generating speed, sad therefore the quantity of data stored in the semiconductor memory decreases, Eventually, the stored data quantity is close to zero and thereafter the data is recorded almost immediately after it is generated.

After the predetermined control adjustment inhibition interval 508 after the completion of the seek period 504, the control adjustment being requested is performed (period 506). For example, in the case where the recording power of the laser used for the recording is adjusted, the optical head is moved from the data region 101 for data recording to the test region 104 provided at the innermost periphery (or the outermost periphery) of the optical disc. Then, by experimentally recording and reproducing test data while changing the recording power by a small amount, the most suitable recording power corresponding to the currant temperature is detected. The circuit constant is adjusted based on the detected most suitable recording power, and the recording thereafter is performed at the most suitable recording power.

During the control adjustment, a data recording on the disc is impossible, and therefore all of the generated data is temporarily stored in the memory and the stored data quantity increases. After the control adjustment is performed, the next seek (not shown) is conducted for returning the optical head to the region 103c for recording the data c. When this next seek is completed, the stored data quantity has reached the maximum value F in FIG. 5.

After the optical head reaches the region 103c, data stored during the control adjustment period 506 is recorded, as well as the data b. The data is recorded at a faster speed than the data generating speed, and therefore the quantity of the data stored in the semiconductor memory decreases. Eventually, the stored data quantity is aloes to zero, and thereafter the data is recorded almost immediately after it is generated.

As described above, according to the present example, no control adjustment is performed even if a control adjustment request is addressed, in the apse where the moment of determination is within the predetermined control adjustment inhibition interval. In other words, at any given moment, a control adjustment is performed only when the seek is not performed during the predetermined period (control adjustment inhibition interval) before or after the given moment. As a result, the quantity of the stored data does not exceed the quantity of data stored in the buffer memory immediately after the seek operation. Therefore, according to the present example, a real time, continuous recording of AV data without interruption is achieved with a semiconductor memory having a capacity smaller than that in the Conventional example.

In FIG. 5, the maximum value of the stored data quantity is represented by reference numeral F. By providing a suitably wide control adjustment inhibition interval, the data quantity reaches approximately 10 Mbit, for example, even if the maximum seek period is one second, the control adjustment performing period is one second, and the data generation speed is 10 Mbps. Therefore, a real time data recording is achieved with a semiconductor memory having a capacity smaller than that in the conventional example shown in FIG. 3.

The control adjustment inhibition interval 508 (Y) has an appropriate length if it is longer than the time required for all of the data stored in the buffer by the seek operation to be output by the subsequent operation, that is if:

$$Y > (\text{data generating speed} \times \text{maximum seek period})/(\text{recording speed} - \text{data generating speed}).$$

In the above description, only the operation for recording is explained. During reproduction, a control adjustment is similarly only performed when the seek is not performed during the predetermined period (control inhibition interval) before or after any given moment. As a result, the quantity of the pre-read data does not decrease by a control adjustment, lees than the level at which the quantity of data stored in the buffer memory is small after a seek operation. Therefore, it is apparent that even in the case where control adjustments are performed during the repeated seeking and reproduction, real time, continuous reproduction of AV data without interruption is achieved with a semiconductor memory having a capacity smaller than that in the conventional example.

A control adjustment request is usually addressed based on the time constant required for a temperature change inside the reproduction/recording apparatus, which is a relatively large value. Therefore, even if a control adjustment is not performed immediately after a control adjustment request as in the first and second examples of the present invention (i.e., a control adjustment is performed after a control adjustment inhibition interval), no actual damage (such as a failure of reproduction/recording due to fluctuations in the recording power of the laser) occurs. For example, if a series of control adjustments regarding laser power adjustment and the like is performed when a disc is inserted or when the power is turned on, and then a reproduction or recording is begun, the control adjustment request based on a temperature increase inside the apparatus due to the execution of these operations is addressed after a time ranging from several minutes to several scarce of minutes. Therefore, providing a control adjustment inhibition interval ranging from several seconds to several scores of seconds produces no actual harm as described above. Furthermore, it is readily understood that an early request for control adjustment map be addressed for allowing a control adjustment inhibition interval ranging from several seconds to several scores of seconds.

THIRD EXAMPLE

Figure 6:
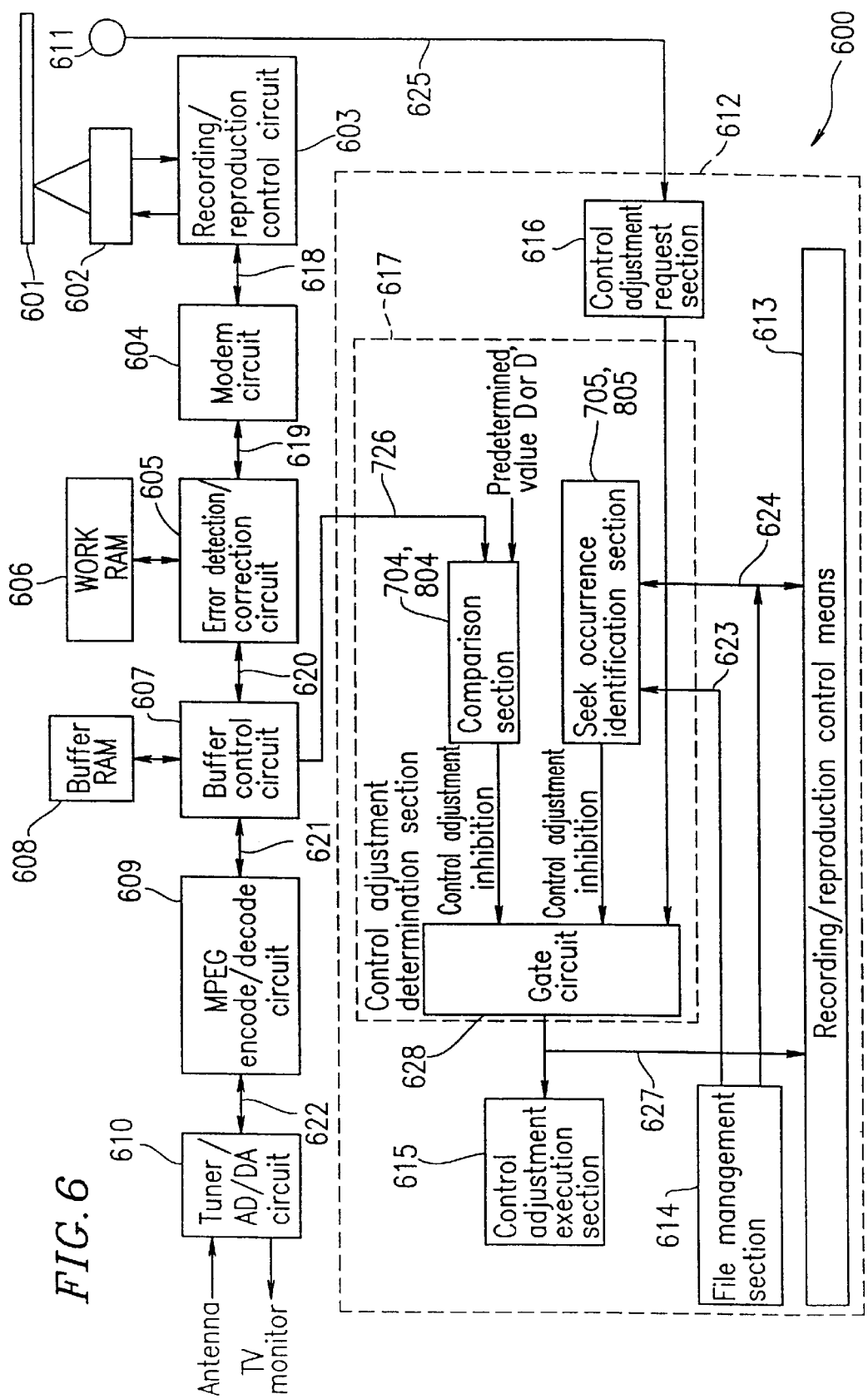
FIG. 6 illustrates an optical disc recording/reproduction apparatus according to a third example of the present invention.

As a third example of the present invention, a reproduction/recording apparatus for a disc-shaped recording medium (optical disc reproduction/recording apparatus) will be described, in which the control adjustment methods described in the first and second examples are implemented. FIG. 6 illustrates a structure of an optical disc recording/reproduction apparatus according to the present invention. The optical disc recording/reproduction apparatus 600 shown in FIG. 6 is provided with a structure for implementing both of the control adjustment methods described in the respective first and second examples.

The optical disc reproduction/recording apparatus 600 includes an optical disc 601, an optical head 602 formed of a semiconductor laser sad optical elements, a reproduction/recording control circuit 609 for performing laser control and for converting the reproduction data to binary data, a modem circuit 604 for digitally modulating recording signals into a form suitable for recording and demodulating the reproduction signals, an error detection/correction circuit 605 for detecting and correcting errors occurring due to scratches and/or dust on the medium, a WORK RAM 606 used for the operation of the error detection/correction circuit 605, a buffer RAM 608 used for a data buffer for the recorded data or the reproduced data, a buffer control circuit 607 for reproduction/recording control of the buffer RAM 608, an MPEG encode/decode circuit 609 for compression/extraction of digital AV data, a tuner AD/DA circuit 610 for receiving TV broadcasts and converting the digitized or extracted AV data to analog data, thereby generating video or audio signals, a temperature sensor 611 for measuring an ambient temperature around the optical head 602, and a control CPU 612 for controlling the entire optical disc reproduction/recording apparatus.

The reproduction operation according to the optical disc reproduction/recording apparatus configured as described above is performed in the following manner. A laser beam from the semiconductor laser provided on the optical head 602 is reflected from the optical disc 601. The reflected light is converted into analog signals, and then amplified and converted to binary data is the reproduction/recording control circuit 603. The binary data is then output to the modem circuit 604 as a digitized reproduction signal 618, which corresponds to the data recorded on the optical disc 601. In the modem circuit 604, the digitally modulated signal (by, e.g., 8/10 modulation) is digitally demodulated. The digitally demodulated signal 619 is then transmitted to the error detection/correction circuit 605, where the detection/correction of errors duo to scratches and/or dust on the medium is performed. For the detection/correction of errors, a known decoding method wing, e.g., REED-SOLOMON codes, is used. After the error detection/correction reproduction data 620 (error corrected/detected data) is stored, as pre-read data, in the buffer RAM 608 through the buffet control circuit 607. During a reproduction, the buffer RAM 608 stores as much reproduction data (pre-read data) as possible for the purpose of specialized reproduction and a faster access. The reproduction data stored in the buffer RAM 606 is transmitted to the MPEG encode/decode circuit 609, where an extraction process on the reproduction data is performed. The extracted data 622 is they transmitted to the tuner AD/DA circuit 610, where the data is converted to analog data and, as AV signals, transmitted to an external apparatus such as a TV set or audio apparatus.

On the other hand, the recording operation according to the present example is performed in the following manner. An input through an antenna from a TV broadcast and the like is input to the tuner AD/DA circuit 610, where the input is digitized as AV data and then output to the MPEG encode/decode circuit 609. The input data is MPEG-encoded in the MPEG encode/decode circuit 609, and than stored in the buffer RAM 609 through the buffer control circuit 607. During recording, the buffer RAM 608 is used for a temporal escape memory for the data which cannot be recorded on the optical disc 601 due to seeking between recorded regions and control adjustments. The data stored in the buffer RAM 608 is then transmitted to the error detection/correction circuit 605, where the data is encoded in an error detected/corrected manner, and then, as encoded data 619, transmitted to the modem circuit 604. The data is then digitally modulated by, e.g., 8/10 modulation, and transmitted to the reproduction/recording control circuit 603. Based on the modulated data, the reproduction/recording control circuit 603 modulates the power of the semiconductor laser included in the optical head 602, and the data is recorded on the optical disc 601.

Total control of the reproduction/recording operation described above is performed by the control CPU 612. The control adjustments described in the first and second examples are also performed by the control CPU 612, The temperature sensor 611 is provided in the vicinity of the optical head 602 or the laser module, so as to measure the currant temperature. The measured temperature value 625 is continuously transmitted to the control CPU 612, in which a control adjustment request section 616 continuously detects a temperature change from the time when the previous control adjustment was performed. When the value of the temperature change exceeds a predetermined temperature difference, a control correction request la transmitted to a control correction determination section 617. The predetermined temperature difference may be set in terms of the control accuracy requirement of the reproduction/recording apparatus. If the control accuracy requirement is high, the predetermined temperature difference can be set at a lower value, and if the control accuracy requirement is low, the predetermined temperature difference can be set at a higher value. The control adjustment determination section 617 calculates the expected seek is the future from the progress of the reproduction/recording, the data quantity stored in the buffer RAM, and the information on the regions for reproduction/recording (which is transmitted from a file management section 614), thereby determining whether or not to execute a control adjustment The control adjustment determination section 617 includes the comparison section 704, 804, seek occurrence identification section 705, 805, and a gate circuit 628. The comparison section 704, 804 compare the data quantity 726 stored in the buffer RAM 608, which is transmitted from the buffer control circuit 607 with the predetermined first data quantity D or second data quantity D', which is set depending on reproduction or recording, thereby determining whether or not to inhibit the control adjustment (see the first example). The seek occurrence identification section 705, 805 compare position 623 of the currant reproduction/recording, which is transmitted from the file management section 614 with an expected position 624 for a future reproduction/recording. The schedule of the future occurrence of the seek is then calculated, and if a seek is predicted to occurs within the predetermined period of time, the control adjustment is inhibited (see the second example. Only when neither of the comparison section 704, 804 nor the seek occurrence identification section 705, 805 determines that the control adjustment should be inhibited does the gate circuit 628 operate so as to execute the control adjustment request from the control adjustment request section 616.

In the aces where the control adjustment determination section 617 determines that the control adjustment should be performed, an instruction for executing control adjustment is sent to a control adjustment execution section 615 and a reproduction/recording control means 613, whereby the reproduction/recording is stopped and a control adjustment is performed.

Prior to the reproduction/recording of AV data, the file management section 614 allots the region for reproduction/recording on the optical disc. Based on the address information of the allotted region, the reproduction/recording control means 613 controls the reproduction/recording. The seek occurrence identification section 705, 805 identifies the progress of the future seek occurrence using the address information for the Legion allotted in advance and the address information for the region for the current reproduction/recording. Note that techniques for file management and region allotment for recording AV data are well known in the art. An example of which is described in the specification of International Patent Application Publication WO98/14938 (FIGS. 3, 9, and 13, page 16, line 11 to page 17, line 10, and page 19, line 14 to page 20, line 2).

Figure 7:
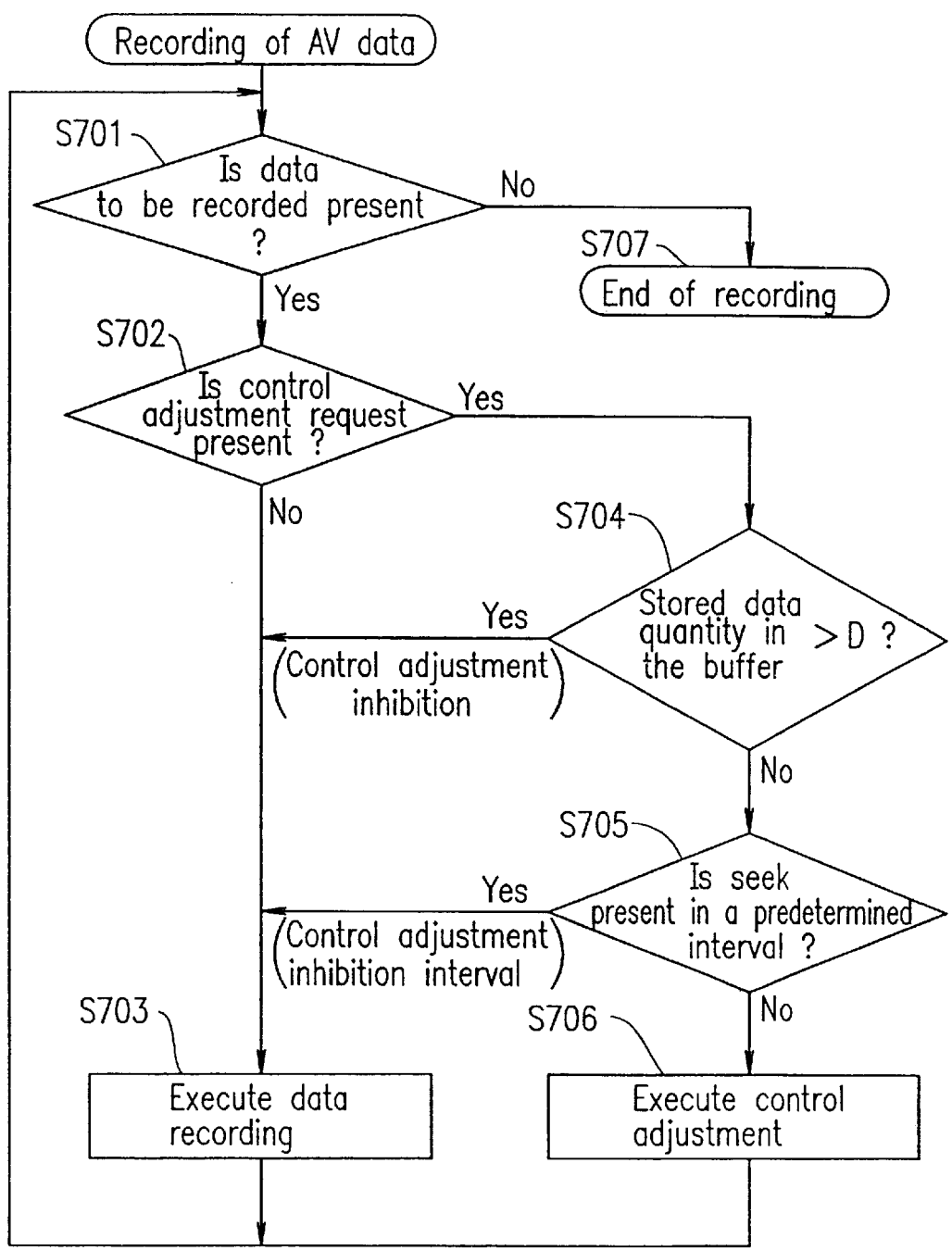
FIG. 7 is a flowchart illustrating the recording operation of the optical disc recording/reproduction apparatus according to the third example of the present invention.
Figure 8:
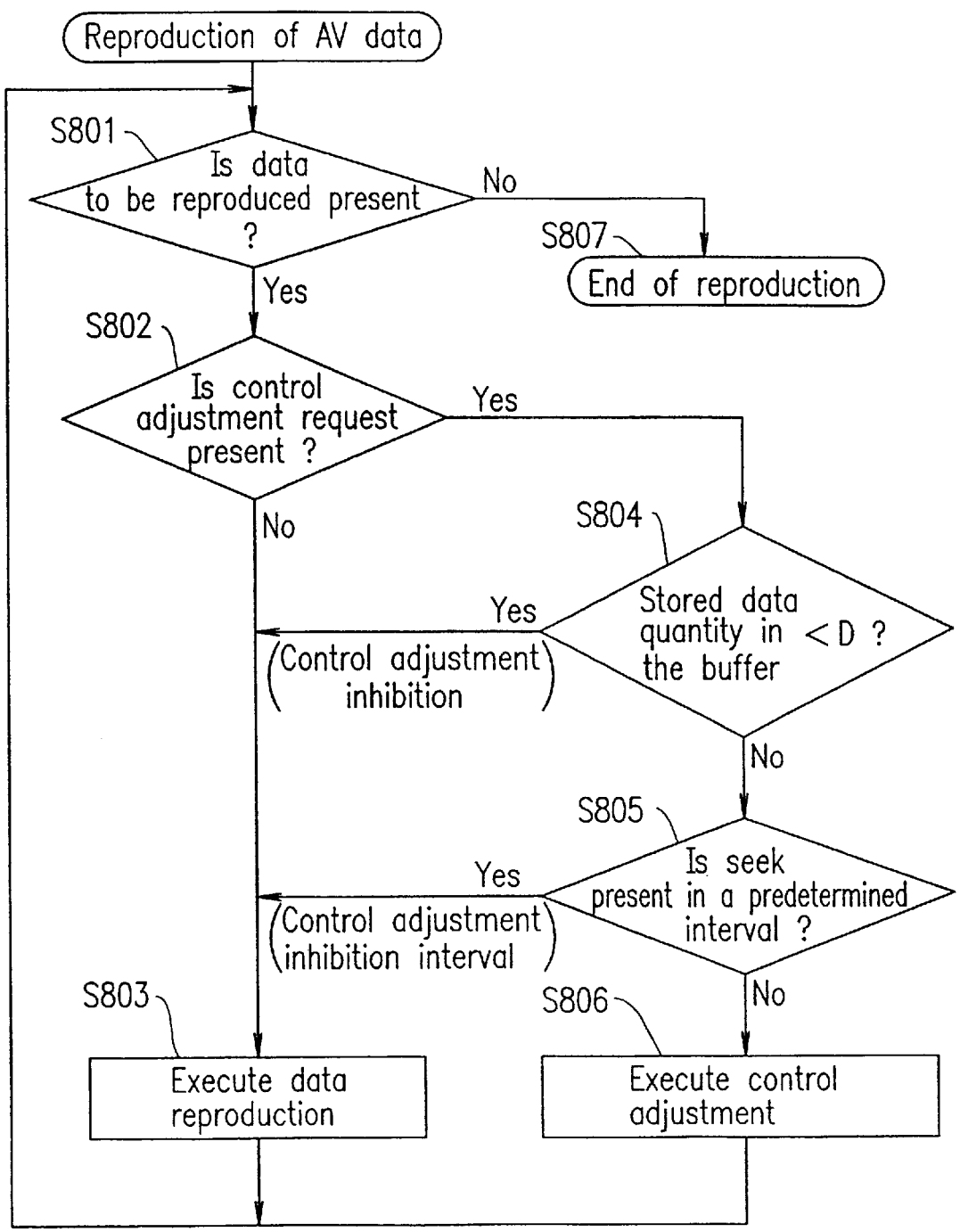
FIG. 8 is a flowchart illustrating the reproducing operation of the optical disc recording/reproduction apparatus according to the third example of the present invention.

FIGS. 7 and 8 are flowcharts illustrating in detail the operation of the control adjustment determination section 617 in the control CPU 612. FIG. 7 relates to a recording of AV data, and FIG. 8 relates to a reproduction of AV data.

The operation of the control adjustment determination section 617 during a recording will now be described with reference to FIG. 7.

At Step S701 whether or not AV data to be recorded is present is determined.

If no AV data to be recorded is present, the recording operation ends (Step S707).

If AV data to be recorded is present, it is determined whether or not a control adjustment request is addressed from the control adjustment request section 616 (Step S702).

If the control adjustment request is not addressed, or if the moment of determination is within a control adjustment inhibition interval, the recording process of the AV data is continued (Step S703).

In the case whore a control adjustment request is addressed, it is determined whether or not the data to be recorded, which is stored in the buffer RAM, is larger than a predetermined first data quantity D (Step S704). If the data quantity stored in the buffer RAM is larger than the first data quantity D, it is determined that the current moment is within a control adjustment inhibition interval, and therefore the control adjustment is not performed and the recording of the AV data is continued (Step S703).

In the case where the data quantity stored in the buffer RAM is smaller than the first data quantity D, it is determined whether or not a seek will occur within a predetermined period (time corresponding to a control adjustment inhibition interval), using the recording region indicated by the file management section 614 and the current recording region (Step S705). If a seek occurs within a predetermined period, it is determined that the current moment is within a control adjustment inhibition interval, and therefore the recording of the AV data is continued (Step S703).

If it is determined that a seek will not occurs within a predetermined period, then the control adjustment execution section 615 is instructed to execute a control adjustment, whereby a control adjustment is performed (Step S706). The control adjustment is performed in a manner similar to that described in the previous examples of the present invention, i.e., the optical head is moved to the test region 104, so as to record/reproduce a test data, whereby the circuit constant and the laser power are set at appropriate levels. During the control adjustment, the data to be recorded, which is output from the MPEG encode/decode circuit 609, is temporarily stored in the buffer RAM 608, and then recorded to the recording region after the control adjustment is completed.

The operation of the control adjustment determination section 617 during a reproduction will now be described with reference to FIG. 8.

At Step S801, whether or not AV data to be reproduced is present is determined.

If no AV data to be reproduced is present, the reproducing operation ends (Step S807).

If AV data to be reproduced is present, it is determined whether or not a control adjustment request is addressed from the control adjustment request section 616 (Step S802).

If the control adjustment request is not addressed, or if the moment of determination is within a control adjustment inhibition interval, the reproducing process of the AV data is continued (Step S803).

In the case where a control adjustment request is addressed, it is determined whether or not the data to be reproduced (pre-read data), which is stored in the buffer RAM, is smaller than a predetermined second data quantity D' (Step S804). If the data quantity stored in the buffer RAM is smaller than the first data quantity D', it is determined that the moment is within a control adjustment inhibition interval, and therefore the reproducing process of the AV data is continued (Step S803).

In the case where the data quantity stored in the buffer RAM is larger than the second data quantity D', whether or not a seek will occur within a predetermined period, using the reproducing region indicated by the file management section 614 and the current reproducing region (Step S805). If a seek occurs within a predetermined period, it is determined that the current moment is within a control adjustment inhibition interval, and therefore the reproducing process of the AV data is continued (Step S803).

If it is determined that a seek will not occur within a predetermined period, then the control adjustment execution section 615 is instructed to execute a control adjustment, whereby a control adjustment is performed (Step S806). The control adjustment is performed in a manner similar to that described in the previous examples of the present invention, i.e., the optical head is moved to the test region 104, so as to record/reproduce a test data, whereby the circuit constant and the laser power are sat at appropriate levels. The focus position may be adjusted so as to obtain the suitable reproduction characteristics. During the control adjustment, the data to be reproduced, which is the pre-read data temporarily stored in the buffer RAM 608, is output to the MPEG encode/decode circuit 609. After the control adjustment is completed, the reproduction of the data is resumed.

As described above, according to the optical disc reproduction/recording apparatus of the present example, it is determined during reproduction/recording whether to perform a control adjustment immediately or to continue the current reproduction/recording for a while, then perform a control adjustment. This determination is made based on the reproduction/recording data quantity stored in the buffer RAM and the prediction result of future seek occurrence. This enables, by providing only a small additional semiconductor memory, a high density recording medium, which performs highly accurate control requiring control adjustments, to reproduce/record data in real-time.

Regarding the determination structure for inhibiting/approving the execution of the control adjustment, the optical reproduction/recording apparatus 600 illustrated in FIG. 6 includes both the structure for determining by the data quantity stored in the semiconductor memory during reproduction/recording (the comparison section 704, 804, see the first example and the structure for determining by the occurrence of a seek within a predetermined period (seek occurrence identification section 705, 806, see the second example. The present invention, however, is not limited to such a configuration. The control adjustment determination section 617 may include either one of a comparison section or a seek occurrence identification section, and may make a determination based on either one of the examples 1 or 2.

Figure 9A:
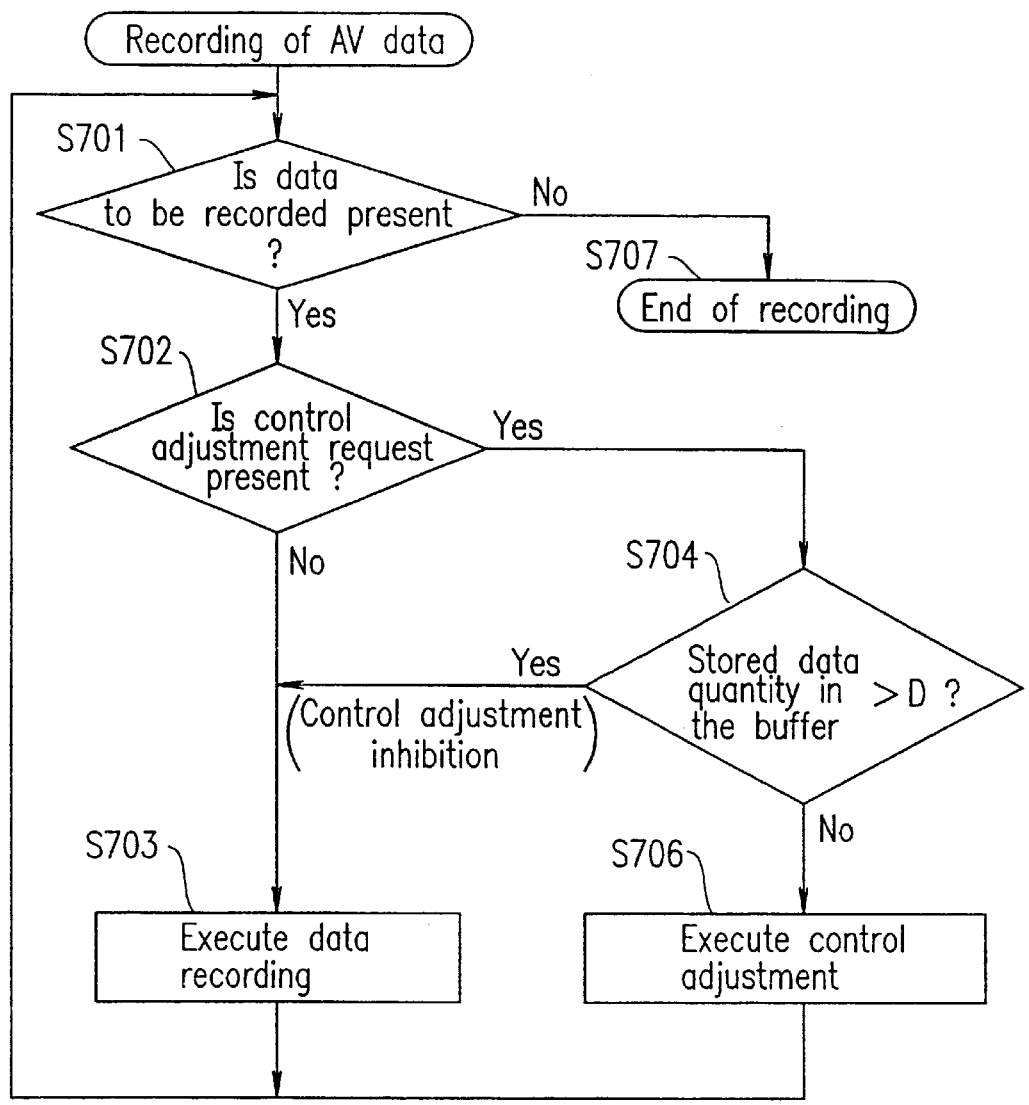
FIG. 9A is a flowchart illustrating the recording operation of another optical disc recording/reproduction apparatus according to the third example of the present invention.
Figure 9B:
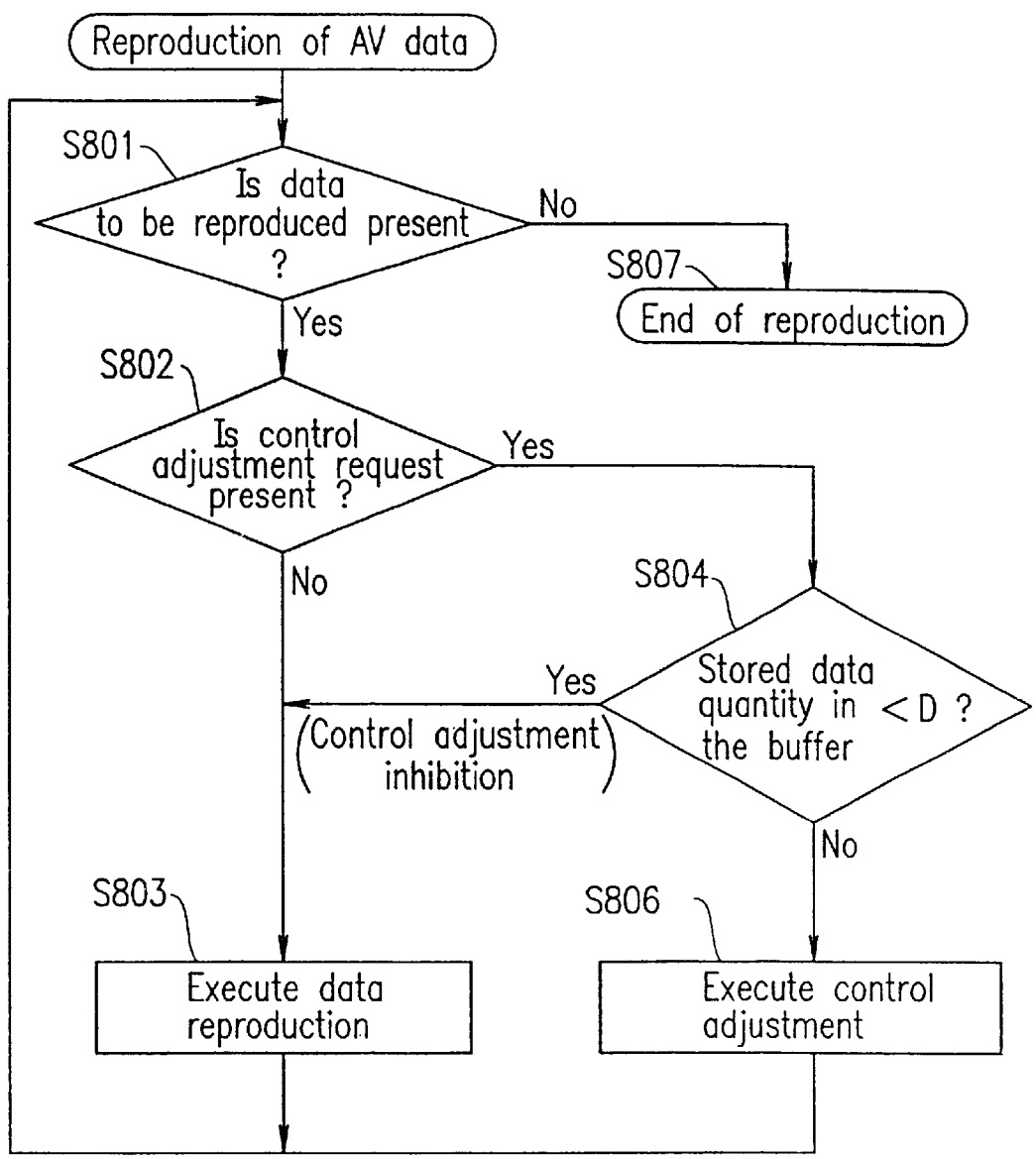
FIG. 9B is a flowchart illustrating the reproducing operation of the another optical disc recording/reproduction apparatus according to the third example of the present invention.
Figure 10A:
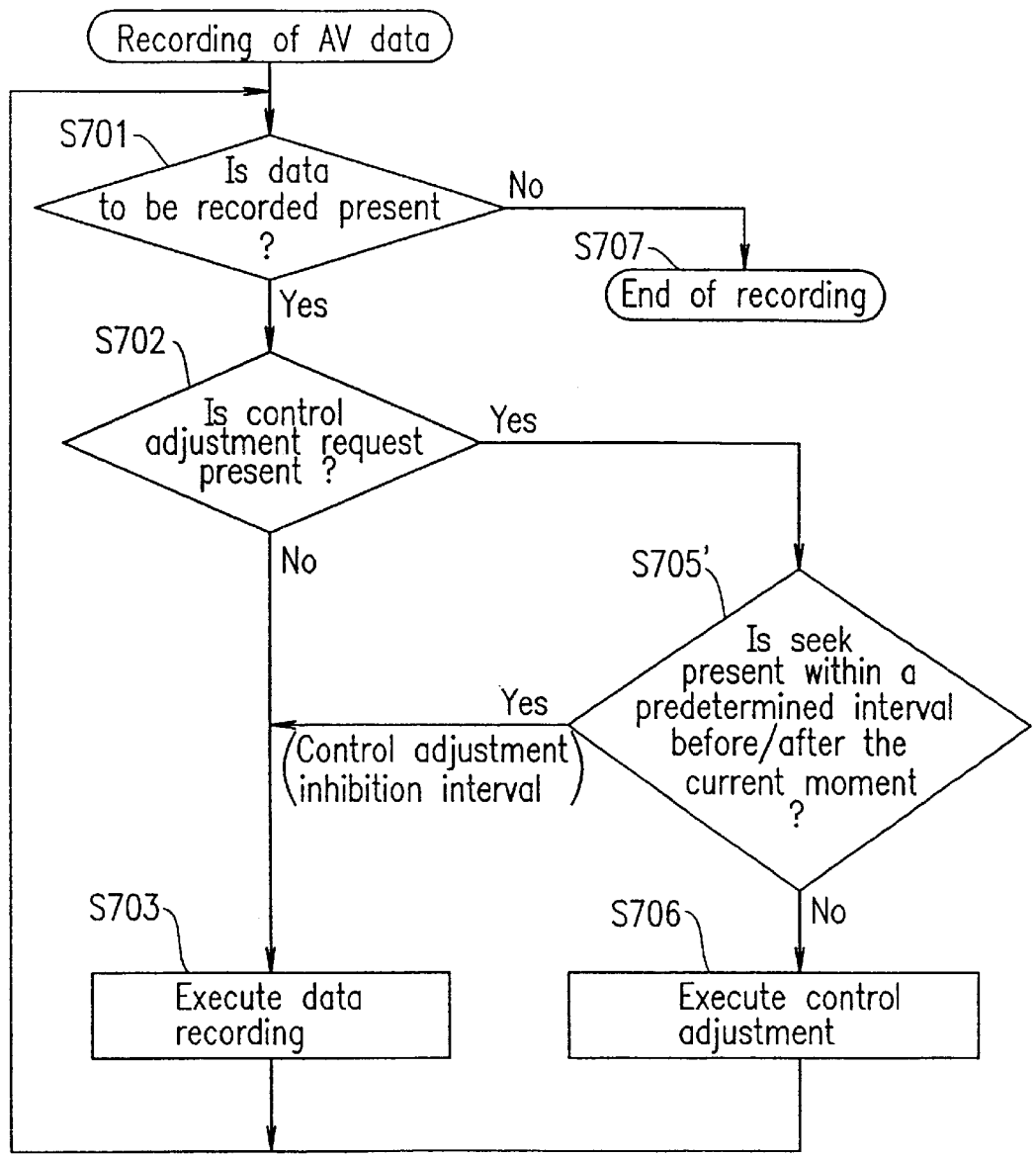
FIG. 10A is a flowchart illustrating the recording operation of still another optical disc recording/reproduction apparatus according to the third example of the present invention.
Figure 10B:
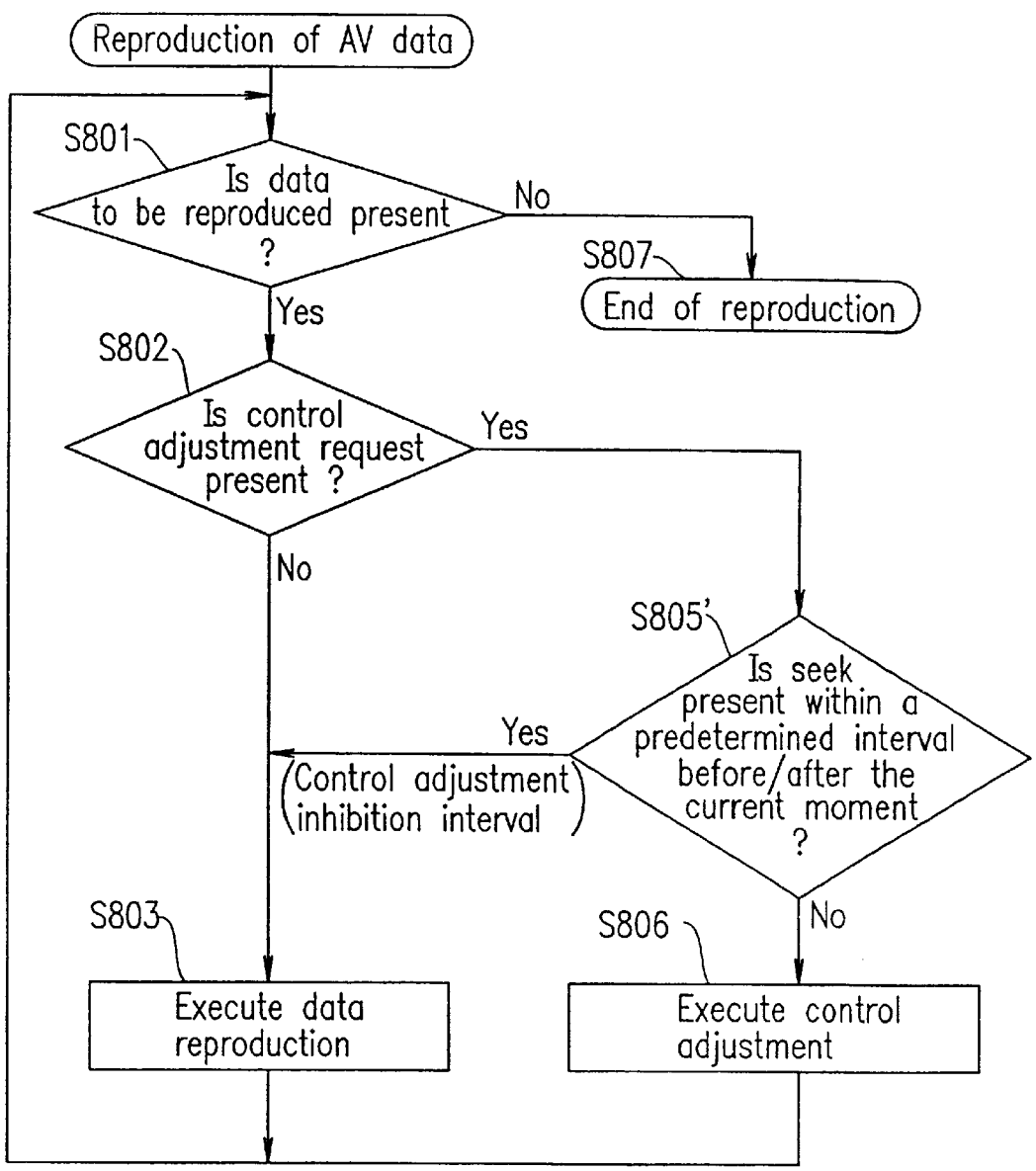
FIG. 10B is a flowchart illustrating the reproducing operation of the still another optical disc recording/reproduction apparatus according to the third example of the present invention.

In the case where the control adjustment determination section 617 only includes the comparison section, nod not the seek occurrence identification section, the control adjustment determination section 617 operates during reproduction/recording as illustrated in FIGS. 9A and 9B. In the case where the control adjustment determination section 617 only includes the seek occurrence identification section, and not the comparison section, the control adjustment determination section 617 operates during reproduction/recording as illustrated in FIGS. 10A and 10B. Furthermore, unlike Step S705 in FIG. 7 and Step S805 in FIG. 8, Step S705' in FIG. 10A and Step S805' in FIG. 10B not only determine whether or not a seek occurs within the predetermined time after the execution of the determination process but also determine whether or not a seek occurs within the predetermined time before the execution of the determination process. According to Step S705 in FIG. 7 and Step S805 in FIG. 8, the data quantity of the buffer memory is determined in the preceding steps 704, 804, respectively, and therefore the process for determining whether or not a seek is performed within the predetermined period before the determination process is not necessary. It should be noted, however, Step S705 and Step S805 may include each a determination.

Although an optical disc reproduction/recording apparatus has been described in the above examples, it is apparent that the present invention is also applicable to, e.g., an HDD recorder, which record the TV broadcasting using a magnetic disc (HDD).

According to the control method of the present invention, a control adjustment process can be performed during reproduction/recording even with a smaller semiconductor memory compared to the conventional method. Furthermore, according to the present invention, an optical disc reproduction recording apparatus using a high recording density optical discs and achieves highly accurate control adjustment during reproduction/recording.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A control adjustment method for adjusting a control of a recording/reproduction apparatus for a disc-shaped recording medium, wherein the control is adjusted in response to an environmental change inside the recording/reproduction apparatus, the control adjustment method comprising the steps of:

requesting an execution of the control adjustment;

determining whether to inhibit or approve the execution of the control adjustment; and executing the control adjustment in the case where the execution of the control adjustment is approved in the step of determining the execution of adjustment.

2. A control adjustment method according to claim 1, wherein:

the disc-shaped recording medium includes a plurality of recording regions provided thereon;

audiovisual data is recorded in the plurality of recording regions by an optical head;

a seek operation is performed during a recording or reproduction of the audiovisual data, such that in the seek operation the optical head moves between the plurality of recording regions; and in the step of determining the execution of the control adjustment, the execution of the control adjustment is inhibited during a predetermined period of time after the execution of the seek operation.

3. A control adjustment method according to claim 1, wherein:

the recording medium includes a plurality of recording regions provided thereon;

audiovisual data is recorded in the plurality of recording regions by an optical head;

a seek operation is performed during a recording or reproduction of the audiovisual data, such that in the seek operation the optical head moves between the plurality of recording regions; and in the step of determining the execution of the control adjustment, the execution of the control adjustment is inhibited in the case where a seek operation is expected to occur within a predetermined period of time from the moment of determination.

4. A control adjustment method according to claim 3, wherein the occurrence of the seek operation is expected based on:

a file management information regarding a recorded location of the audiovisual data on the recording medium; and the location where the current recording/reproduction is being performed.

5. A control adjustment method according to claim 1, wherein:

the recording/reproduction apparatus includes a memory section for temporarily storing audiovisual data for recording/reproduction; and in the step of determining the execution of the control adjustment, an inhibition or approval of the execution of the control adjustment is determined based on a quantity of data stored in the memory section during recording/reproduction.

6. A control adjustment method according to claim 5, wherein the control adjustment is inhibited during recording, in the case where the quantity of the data stored in the memory section is equal to or more than a predetermined first data quantity.

7. A control adjustment method according to claim 5, wherein the control adjustment is inhibited during reproduction, in the case where the quantity of the data stored in the memory section is equal to or lose than a predetermined second data quantity.

8. A control adjustment method according to claim 1, wherein the execution of the control adjustment is requested in the step of requesting adjustment when it is detected that an internal temperature change of the apparatus from the time of a previous execution exceeds a predetermined temperature difference.

9. A control adjustment method according to claim 1, wherein the adjustment executing step includes: the steps of adjusting laser power during recording; and adjusting focus position during reproduction.

10. A recording/reproduction apparatus, comprising:

a recording/reproduction section for recording/reproducing audiovisual data on a disc-shaped recording medium;

a memory section for temporarily storing audiovisual data for recording/reproduction;

an adjustment request section for outputting an adjustment request for executing control adjustment;

an adjustment determination section for determining whether to inhibit or approve the execution of the control adjustment, and outputting an instruction indicating inhibition or approval; and an adjustment execution section for executing the control adjustment in the case where the instruction indicating approval is received.

11. A recording/reproduction apparatus according to claim 10, wherein:

the recording medium includes a plurality of recording regions provided thereon;

audiovisual data is recorded in the plurality of recording regions by an optical head;

a seek operation is performed during a recording or reproduction of the audiovisual data, such that in the seek operation the optical head moves between the plurality of recording regions; and the adjustment determination section outputting an instruction indicating inhibition of the execution of the control adjustment fluting a predetermined period of time after the execution of the seek operation to the adjustment execution section.

12. A recording/reproduction apparatus according to claim 10, wherein:

the recording medium includes a plurality of recording regions provided thereon;

audiovisual data is recorded in the plurality of recording regions by an optical head;

a seek operation is performed during a recording or reproduction of the audiovisual data, such that in the seek operation the optical hand moving between the plurality of recording regions; and the adjustment determination section inhibits the execution of the control adjustment in the case where a seek operation is expected to occur within a predetermined period of time from the moment of determination.

13. A recording/reproduction apparatus according to claim 12, wherein the occurrence of the soak operation is expected based on a file management information regarding a recorded location of the audiovisual data on the recording medium; and the location where the current recording/reproduction is being performed.

14. A recording/reproduction apparatus according to claim 10, wherein an inhibition or approval of the execution of control adjustment is determined based on a quantity of data stored in the memory section during recording/reproduction.

15. A recording/reproduction apparatus according to claim 14, wherein the control adjustment is inhibited during recording, in the case where the quantity of the data stored in the memory section is equal to or more than a predetermined first data quantity.

16. A recording/reproduction apparatus according to claim 14, wherein the control adjustment is inhibited during reproduction, in the case where the quantity of the data stored in the memory section is equal to or less than a predetermined seconds data quantity.

17. A recording/reproduction apparatus according to claim 10, wherein the adjustment request section outputs a request of adjustment when it is detected that an internal temperature change of the apparatus from the time of a previous execution exceeds a predetermined temperature difference.

18. A recording/reproduction apparatus according to claim 10, wherein the adjustment execution section performs adjustment of laser power during recording and adjustment of focus position curing reproduction.

* * * * *

UNITED STATES PATENT AND TRADEMARK OFFICE
CERTIFICATE OF CORRECTION

PATENT NO.    : 6,567,350 B1                                            Page 1 of 1
DATED         : May 20, 2003
INVENTOR(S)   : Yuji Takagi et al.

It is certified that error appears in the above-identified patent and that said Letters Patent is hereby corrected as shown below:

Column 20,
Line 46, "lose" should be -- less --.

Column 21,
Line 31, "fluting" should be -- during --.
Line 31, "hand" should be -- head --.

Column 22,
Line 11, after "based on" should be -- : --.
Line 22, "seconds" should be -- second --.
Line 32, "curing" should be -- during --.

Signed and Sealed this

Nineteenth Day of August, 2003

JAMES E. ROGAN
*Director of the United States Patent and Trademark Office*